US008577962B2

(12) United States Patent
Eshima et al.

(10) Patent No.: US 8,577,962 B2
(45) Date of Patent: Nov. 5, 2013

(54) SERVER APPARATUS, CLIENT APPARATUS, CONTENT RECOMMENDATION METHOD, AND PROGRAM

(75) Inventors: Masashi Eshima, Tokyo (JP); Tatsumi Sakaguchi, Kanagawa (JP); Koji Kashima, Kanagawa (JP); Hiroshi Oryoji, Kanagawa (JP)

(73) Assignee: Sony Corporation (JP)

( * ) Notice: Subject to any disclaimer, the term of this patent is extended or adjusted under 35 U.S.C. 154(b) by 189 days.

(21) Appl. No.: 13/065,481

(22) Filed: Mar. 23, 2011

(65) Prior Publication Data

US 2011/0246561 A1 Oct. 6, 2011

(30) Foreign Application Priority Data

Mar. 31, 2010 (JP) ................ P2010-084558

(51) Int. Cl.
*G06F 15/16* (2006.01)
(52) U.S. Cl.
USPC ........................................... 709/203
(58) Field of Classification Search
USPC ........................................... 709/203
See application file for complete search history.

(56) References Cited

U.S. PATENT DOCUMENTS

| 2007/0073562 | A1* | 3/2007 | Brice et al. ............... | 705/5 |
| 2008/0215548 | A1* | 9/2008 | Ohashi et al. ............ | 707/3 |
| 2008/0310686 | A1* | 12/2008 | Kretz ...................... | 382/118 |
| 2009/0037449 | A1* | 2/2009 | Fagans et al. ............ | 707/101 |
| 2009/0070325 | A1* | 3/2009 | Gabriel et al. ........... | 707/5 |
| 2009/0158307 | A1* | 6/2009 | Kashitani ................. | 725/9 |
| 2011/0243452 | A1* | 10/2011 | Sakaguchi et al. ....... | 382/190 |
| 2011/0243529 | A1* | 10/2011 | Oryoji et al. ............. | 386/248 |

FOREIGN PATENT DOCUMENTS

JP 2009-147679 A 7/2009

OTHER PUBLICATIONS

Regression Analysis (Wikipedia, www.wikipedia.org, Nov. 4, 2008).*
Understanding Video Events: A Survey of Methods for Automatic Interpretation of Semantic Occurrences in Video, Gal Lavee, Ehud Rivlin, and Michael Rudzsky, IEEE Transactions on Systems, Man, and Cybernetics—Part C: Applications and Reviews, vol. 39, No. 5, Sep. 2009, pp. 1-64.
Event Mining in Multimedia Streams: Research on identifying and analyzing events and activities in media collections had led to new technologies and systems, Lexing Xie, Hari Sundaram, and Murray Campbell, Proceedings of the IEEE, vol. 96, No. 4, Apr. 2008, pp. 623-647.

* cited by examiner

*Primary Examiner* — Benjamin R Bruckart
*Assistant Examiner* — Nicholas Celani
(74) *Attorney, Agent, or Firm* — Lerner, David, Littenberg, Krumholz & Mentlik, LLP

(57) ABSTRACT

A server apparatus includes a first storage, a second storage, a communication unit, and a controller. The first storage is configured to store statistical information that is generated by performing a statistical process of a plurality of pieces of first meta and second meta information and that indicates a frequency of the first meta information. The second storage is configured to store a plurality of pieces of content information that indicates one of a commodity content and a service content to be recommended. The communication unit is configured to receive, from a client apparatus, the second meta information. The controller is configured to select content information relating to the first meta information having predetermined frequencies or more with respect to the received second meta information from the plurality of pieces of content information stored, and control the communication unit to transmit the content information to the client apparatus.

10 Claims, 10 Drawing Sheets

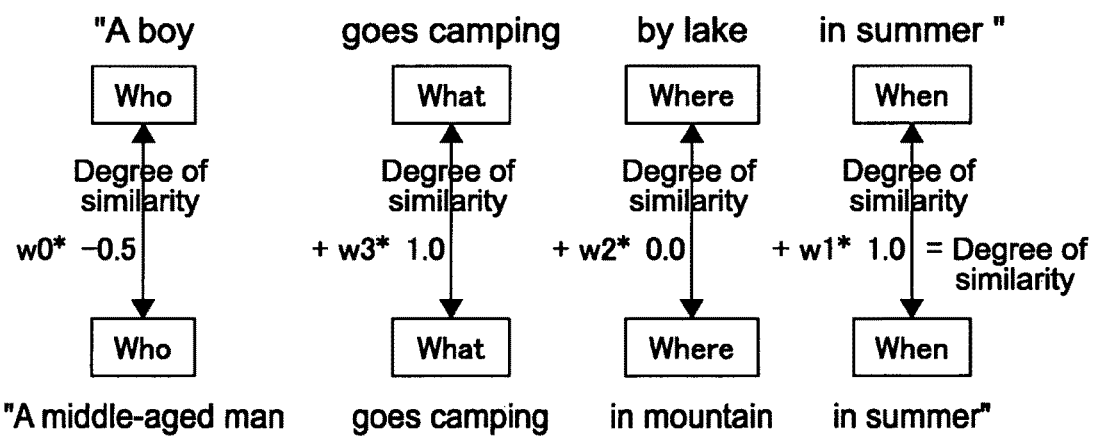

FIG.11A
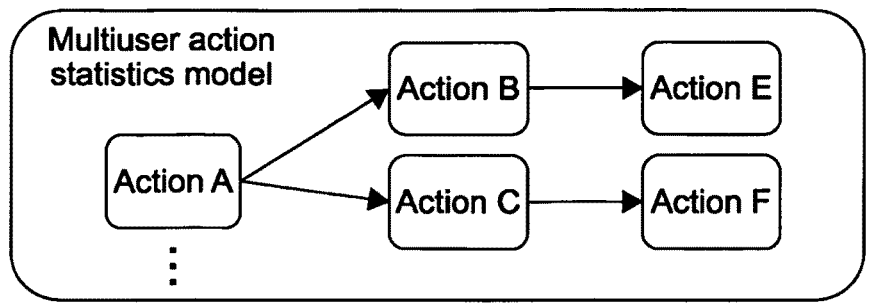
FIG.11B
Action of person A (usual)
Action of person A
(in case where action not included in
multiuser action statistics model is taken)
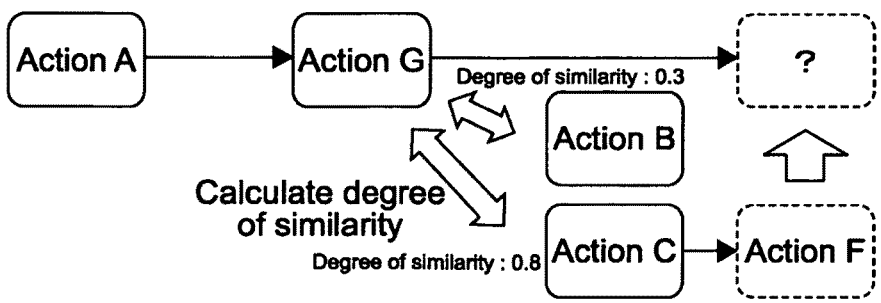

SERVER APPARATUS, CLIENT APPARATUS, CONTENT RECOMMENDATION METHOD, AND PROGRAM

CROSS-REFERENCE TO RELATED APPLICATION

The present application claims priority from Japanese Patent Application No. JP 2010-084558 filed in the Japanese Patent Office on Mar. 31, 2010, the entire content of which is incorporated herein by reference.

BACKGROUND OF THE INVENTION

1. Field of the Invention

The present invention relates to a server apparatus, a client apparatus, a content recommendation method, and a program capable of recommending contents of commodities, services, or the like.

2. Description of the Related Art

In related art, for example, in an e-commerce site, a browse history and a purchase history of a user are used, to recommend a content of a commodity, a service, or the like to a user. Further, in a Web retrieval service, the contents of a web site which is browsed by a user, a retrieval word input by a user, a web page browse history of a user, or the like is used, to display advertisement information of a content.

Japanese Patent Application Laid-open No. 2009-147679 (hereinafter, referred to as Patent Document 1) discloses that the taste of a user is analyzed on the basis of a commercial inserted in a TV program or the like viewed by the user, and commodities that fit the user's taste are specified, thereby generating information of recommendation commodities.

SUMMARY OF THE INVENTION

However, in methods of the aforementioned e-commerce site and Web advertisement, a content to be recommended is decided on the basis of history information in the case of using a specific site or a specific retrieval service by a user, but history information in the case of using another e-commerce site or another retrieval service by the user is not taken into consideration. Therefore, in those methods, the taste in daily action of the user is not reflected on a recommended content.

Further, in the technique disclosed in Patent Document 1, the user's taste with respect to a TV program is reflected on the recommended content, but the taste in daily action of the user is difficult to be reflected on the recommended content as described above.

In view of the above-mentioned circumstances, it is desirable to provide a server apparatus, a client apparatus, a content recommendation method, and a program capable of recommending a content, on which the user's taste is truly reflected, on the basis of features extracted from a user's tendency of daily action.

According to an embodiment of the present invention, there is provided a server apparatus including a first storage, a second storage, a communication unit, and a controller. The first storage is configured to store statistical information that is generated by performing a statistical process of a plurality of pieces of first meta information and a plurality of pieces of second meta information. The statistical information indicates a frequency of the plurality of pieces of first meta information as a derivation source of the plurality of pieces of second meta information for each piece of second meta information. The plurality of pieces of first meta information is extracted from image data taken by a plurality of users. The plurality of pieces of second meta information is derived from the plurality of pieces of first meta information through an analysis. The second storage is configured to store a plurality of different pieces of content information that indicates one of a commodity content and a service content to be recommended. The communication unit is configured to receive, from a client apparatus of one of the plurality of users, the second meta information derived from the plurality of pieces of first meta information in the client apparatus. The controller is configured to select, on the basis of the second meta information received and the statistical information stored, content information relating to the first meta information having predetermined frequencies or more with respect to the received second meta information from the plurality of pieces of content information stored. Further, the controller controls the communication unit to transmit the content information selected to the client apparatus.

With this structure, on the basis of the statistical information stored and the second meta information received from the client apparatus, the server apparatus is capable of selecting the content information to be recommended to the user of the client apparatus, and providing the content information to the client apparatus. By selecting the content information on the basis of the second meta information derived from the plurality of pieces of first meta information extracted from the image taken by the user, the content information on which a taste extracted from the tendency of user's daily action is reflected is recommended.

The second meta information may include person information that indicates a person in the image and action information that indicates action details of the person. In this case, the controller may be configured to compare first person information and first action information that are included in the second meta information included in the statistical information with second person information and second action information that are included in the second meta information transmitted from the client apparatus, respectively, to calculate a first degree of similarity that indicates a degree of similarity between the first person information and the second person information and a second degree of similarity that indicates a degree of similarity between the first action information and the second action information. Further, the controller may be configured to calculate a third degree of similarity by adding the first degree of similarity and the second degree of similarity calculated, and to select content information relating to the first meta information having the predetermined frequencies or more with respect to the second meta information having the third degree of similarity that is equal to or higher than a predetermined degree of similarity with the second meta information transmitted from the client apparatus.

With this structure, the server apparatus calculates the degree of similarity between the pieces of second meta information on the basis of the person and the action details obtained from the taken image and selects the content information on the basis of the degree of similarity, so it is possible to recommend the content information which is fitter for the tendency of the user's daily action.

The content information may be information that indicates a commodity for a travel. In this case, the communication unit may be configured to receive the plurality of pieces of second meta information from the client apparatus. Further, in this case, the controller may be configured to select, for each piece of second meta information, pieces of content information that relate to the plurality of pieces of first meta information having the predetermined frequencies or more with respect to the plurality of pieces of second meta information received and that are capable of being set as courses in the travel. Furthermore, the controller may be configured to generate integrated content information obtained by integrating the pieces of content information selected, and to control the communication unit to transmit the integrated content information generated to the client apparatus.

With this structure, the server apparatus integrates the plurality of pieces of content information as the courses in the travel, which relates to the first meta information, respectively, thereby making it possible to recommend a travel plan arranged so as to be based on a plurality of tastes of the user. As a result, as compared to the case where a travel plan is just recommended as one piece of content information relating to the first meta information, the increase in level of user satisfaction can be expected thanks to various synergistic effects.

The plurality of pieces of second meta information received may have correlation information that indicates a correlation of a plurality of pieces of action information. In this case, the controller may be configured to determine the pieces of content information set as the courses and an order of setting thereof on the basis of the correlation information.

With this structure, from the correlation information, the server apparatus can recognize an action which the user of the client apparatus highly frequently takes after a certain action. In accordance with this, the courses in the travel can be set. Thus, the commodity for the travel as the integrated content which is provided to the user is based on a usual action pattern of the user, and therefore can highly probably be adopted by the user.

The second meta information may have date information that indicates a date corresponding to the action information. In this case, the controller may be configured to generate, on the basis of the action information and the date information that are included in the plurality of pieces of second meta information included in the statistical information, transition probability information that indicates a probability of transition from a first action detail to a second action detail out of the action details. Further, the controller may be configured to select, on the basis of the transition probability information generated, content information relating to an action detail whose probability of transition from the action detail indicated by the action information included in the second meta information received is equal to or higher than a predetermined probability.

With this structure, the server apparatus generates the transmission probability of the action details from the second meta information for each user, and can recommend to the user a commodity or service relating to action details having higher transition probability from the action details indicated by the second meta information received. That is, the server apparatus can recommend to the user a commodity or service which may highly probably be required for an action subsequent to a certain action of the user, so the user can easily make a preparation for the next action.

According to another embodiment of the present invention, there is provided a client apparatus including a communication unit, a storage, a controller, and an output unit. The communication unit is configured to communicate with a server apparatus that stores a plurality of different pieces of content information that indicates one of a commodity content and a service content to be recommended. The storage is configured to store image data taken by a user. The controller is configured to extract a plurality of pieces of first meta information from the image data, derive second meta information by analyzing the plurality of pieces of first meta information extracted, and control the communication unit to receive, on the basis of the second meta information derived, content information relating to the second meta information out of the plurality of pieces of content information stored in the server apparatus. The output unit is configured to output the content information received.

According to another embodiment of the present invention, there is provided a content recommendation method including storing statistical information that is generated by performing a statistical process of a plurality of pieces of first meta information and a plurality of pieces of second meta information. The statistical information indicates a frequency of the plurality of pieces of first meta information as a derivation source of the plurality of pieces of second meta information for each piece of second meta information. The plurality of pieces of first meta information being extracted from image data taken by a plurality of users. The plurality of pieces of second meta information being derived from the plurality of pieces of first meta information through an analysis. Further, the content recommendation method includes storing a plurality of different pieces of content information that indicates one of a commodity content and a service content to be recommended. From a client apparatus of one of the plurality of users, the second meta information derived from the plurality of pieces of first meta information in the client apparatus is received. On the basis of the second meta information received and the statistical information stored, content information relating to the first meta information having predetermined frequencies or more with respect to the received second meta information is selected from the plurality of pieces of content information stored. The content information selected is transmitted to the client apparatus.

According to another embodiment of the present invention, there is provided a content recommendation method including storing image data taken by a user, extracting a plurality of pieces of first meta information from the image data, deriving second meta information by analyzing the plurality of pieces of first meta information extracted, receiving, on the basis of the second meta information derived, content information relating to the second meta information out of the plurality of pieces of content information stored in the server apparatus, and outputting the content information received.

According to another embodiment of the present invention, there is provided a program configured to cause a server apparatus to execute a first storing step, a second storing step, a receiving step, a selecting step, and a transmitting step. In the first storing step, statistical information that is generated by performing a statistical process of a plurality of pieces of first meta information and a plurality of pieces of second meta information is stored. The statistical information indicates a frequency of the plurality of pieces of first meta information as a derivation source of the plurality of pieces of second meta information for each piece of second meta information. The plurality of pieces of first meta information is extracted from image data taken by a plurality of users, and the plurality of pieces of second meta information is derived from the plurality of pieces of first meta information through an analysis. In the second storing step, a plurality of different pieces of content information that indicates one of a commodity content and a service content to be recommended is stored. In the receiving step, from a client apparatus of one of the plurality of users, the second meta information derived from the plurality of pieces of first meta information in the client apparatus is received. In the selecting step, on the basis of the second meta information received and the statistical information stored, content information relating to the first meta information having predetermined frequencies or more with respect to the received second meta information is selected from the plurality of pieces of content information stored. In the transmitting step, the content information selected is transmitted to the client apparatus.

According to another embodiment of the present invention, there is provided a program configured to cause a client apparatus to execute a storing step, an extracting step, a deriving step, a receiving step, and an outputting step. In the storing step, image data taken by a user is stored. In the extracting step, a plurality of pieces of first meta information is extracted from the image data. In the deriving step, second meta information is derived by analyzing the plurality of pieces of first meta information extracted. In the receiving step, on the basis of the second meta information derived, content information relating to the second meta information out of the plurality of pieces of content information stored in the server apparatus is received. In the outputting step, the content information received is output.

As described above, according to the embodiments of the present invention, it is possible to recommend a content that is truly based on the taste of the user on the basis of the features extracted from the tendency of the user's daily action.

These and other objects, features and advantages of the present invention will become more apparent in light of the following detailed description of best mode embodiments thereof, as illustrated in the accompanying drawings.

BRIEF DESCRIPTION OF DRAWINGS

FIG. 9 are diagrams showing an example of the degree-of-similarity calculation process of the individual features in the embodiment of the present invention;

FIG. 11 are diagrams showing an action prediction process in the case where content information is recommended on the basis of an action prediction in another embodiment of the present invention.

DESCRIPTION OF PREFERRED EMBODIMENTS

Hereinafter, the embodiments of the present invention will be described with reference to the drawings.

(Outline of System)

Figure 1:
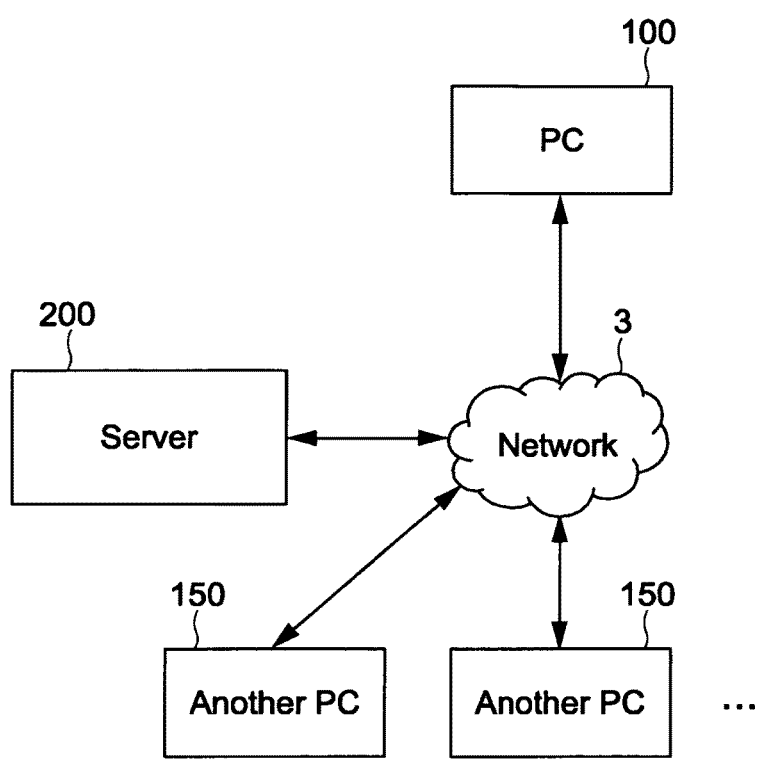
FIG. 1 is a diagram showing the outline of a content recommendation system in an embodiment of the present invention.

FIG. 1 is a diagram showing the outline of a content recommendation system in an embodiment of the present invention. As shown in FIG. 1, the content system recommendation system is constituted by connecting a PC 100, other PCs 150, and a server 200 with each other via a network 3.

The PC 100 and the other PCs 150 each extract meta information from a moving image or a still image taken by each user and transmit the image to the server 200. On the basis of the meta information received from the PC 100 and the other PCs 150, the server 200 selects content information to be recommended to each user of the PC 100 and the other PCs 150 from a plurality of pieces of content information relating to commodities or services stored therein and transmits the selected content information to the PC 100 and the other PCs 150. The network 3 refers to the Internet, a LAN (local area network), a WAN (wide area network), or the like.

(Hardware Structure of PC)

Figure 2:
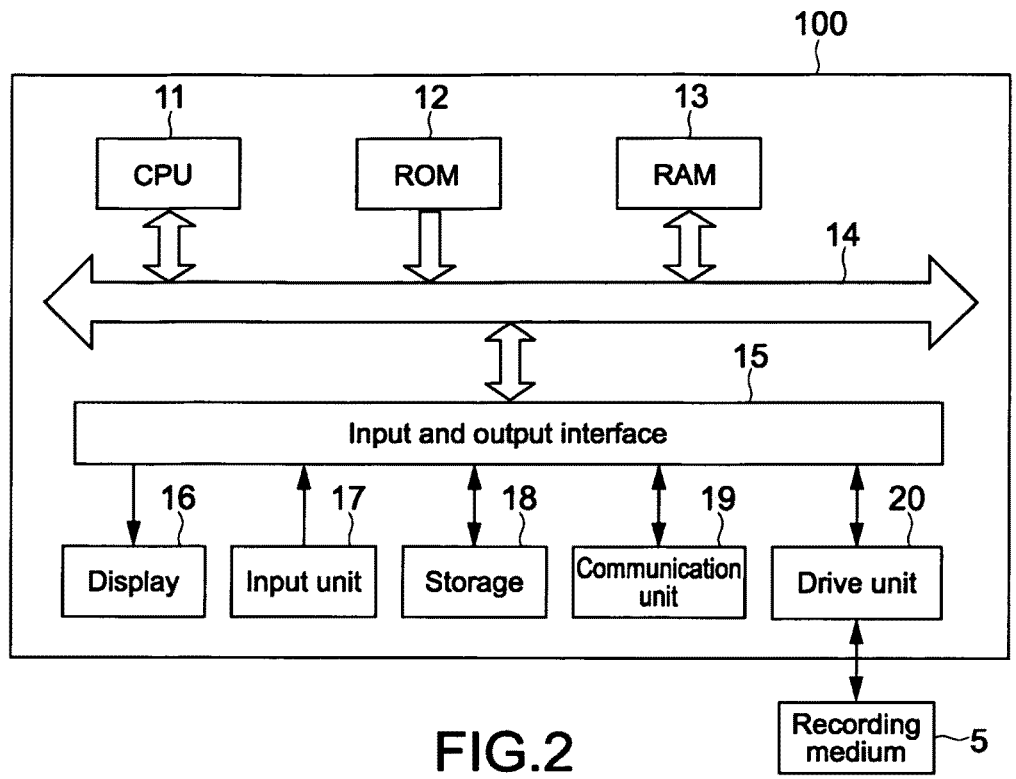
FIG. 2 is a diagram showing a hardware structure of a PC according to the embodiment of the present invention.

FIG. 2 is a diagram showing a hardware structure of the PC 100. As shown in FIG. 2, the PC 100 is provided with a CPU (central processing unit) 11, a ROM (read only memory) 12, a RAM (random access memory) 13, an input and output interface 15, and a bus 14 which connects those with each other.

The CPU 11 accesses the RAM 13 or the like when necessary and performs overall control of entire blocks of the PC 100 while performing various computation processes. The ROM 12 is a nonvolatile memory in which an OS, a program, a firmware such as various parameters, and the like are fixedly stored. The RAM 13 is used as a work area or the like of the CPU 11 and temporarily stores the OS, various applications in execution, or various pieces of data which are being processed.

To the input and output interface 15, a display 16, an input unit 17, a storage 18, a communication unit 19, a drive unit 20, and the like are connected.

The display 16 is a display device which uses liquid crystal, EL (electro-luminescence), a CRT (cathode ray tube), or the like. The display 16 may be built in the PC 100 or may be externally connected to the PC 100.

The input unit 17 is, for example, a pointing device such as a mouse, a keyboard, a touch panel, or another operation apparatus. In the case where the input unit 17 includes the touch panel, the touch panel can be integrally provided with the display 16.

The storage 18 is a nonvolatile memory such as an HDD (hard disk drive), a flash memory, and another solid-state memory. In the storage 18, the OS, various applications, and various pieces of data are stored. In particular, in this embodiment, meta information is extracted from data of a moving image, a still image, or the like loaded from a storage medium 5, and a content recommendation application for displaying content information selected by the server 200 on the basis of the meta information and the meta information extracted are stored in the storage 18.

The drive unit 20 drives the removable storage medium 5 such as a memory card, an optical recording medium, a floppy (registered trademark) disk, and a magnetic recording tape, and reads data recorded in the recording medium 5 and writes data to the recording medium 5. Typically, the recording medium 5 is a memory card threaded into a digital camera, and the PC 100 reads data of a still image or a moving image from the memory card taken out of the digital camera and threaded into the drive unit 20. The digital camera and the PC 100 may be connected through a USB (universal serial bus) cable or the like, to load the still image or the moving image from the memory card to the PC 100 with the memory card being threaded in the digital camera.

The communication unit 19 is a NIC (network interface card) or the like which is connectable to the network 3. The communication unit 19 may perform wired or wireless communication.

(Hardware Structure of Server)

Figure 3:
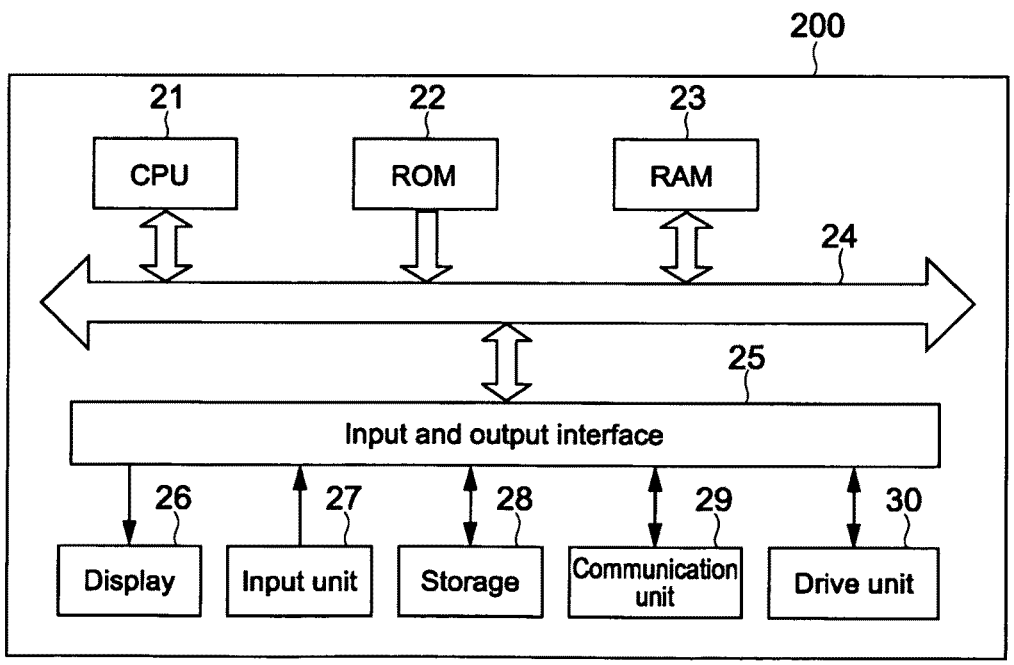
FIG. 3 is a diagram showing a hardware structure of a server according to the embodiment of the present invention.

FIG. 3 is a diagram showing a hardware structure of the server 200. As shown in FIG. 3, the server 200 is provided with a CPU 21, a ROM 22, a RAM 23, an input and output interface 25, and a bus 14 which connects those with each other. To the input and output interface 25, a display 26, an input unit 27, a storage 28, a communication unit 29, a drive unit 30, and the like are connected. The functions of those blocks are the same as the functions of the blocks of the PC 100, so the description thereof will be omitted.

In the storage 18, content information which indicates a commodity or a service for recommendation to a user, a recommendation content selection application for providing to the PC 100 or the PCs 150 by selecting content information to be recommended to a user from the content information concerned, a database necessary for the recommendation, or the like is stored.

(Software Structure of PC and Server)

Figure 4:
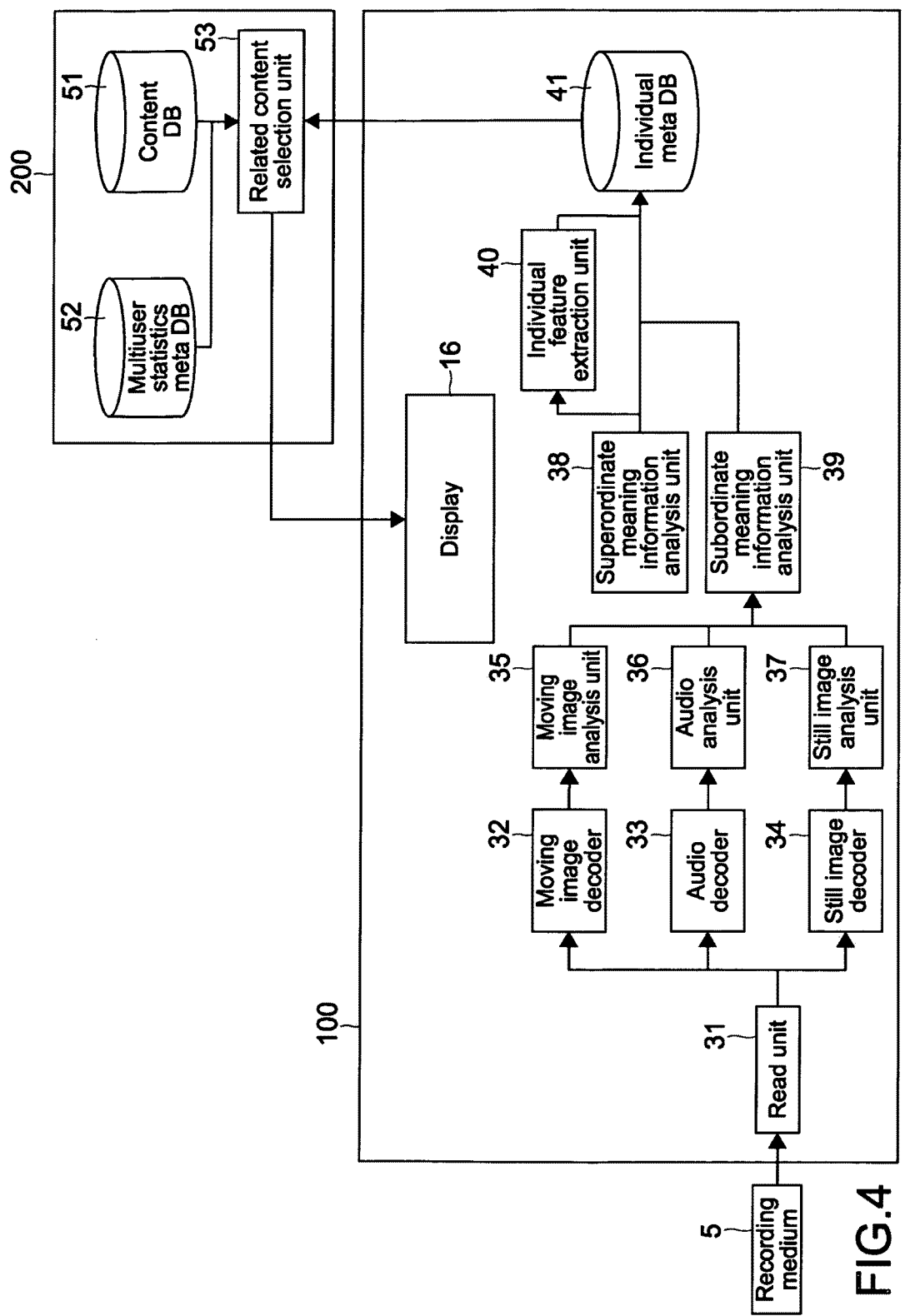
FIG. 4 is a diagram showing a software structure of the server and the PC according to the embodiment of the present invention.

FIG. 4 is a diagram showing functional blocks of the PC 100 and the server 200 for the content recommendation.

As shown in FIG. 4, the PC 100 includes a read unit 31, a moving image decoder 32, an audio decoder 33, a still image decoder 34, a moving image analysis unit 35, an audio analysis unit 36, a still image analysis unit 37, a superordinate meaning information analysis unit 38, a subordinate meaning information analysis unit 39, an individual feature extraction unit 40, and an individual meta DB (database) 41.

The read unit 31 reads a moving image content or a still image data from the recording medium 5 such as a memory card built in an image-taking apparatus such as a digital still camera and a digital video camera or taken out of the image-taking apparatus. The still image data is read for each group based on a date or a time period, for example. In the case where the data that has read is a moving image content, the read unit 31 divides the moving image content into moving image data and audio data. Then, the read unit 31 outputs the moving image data to the moving image decoder 32, outputs the audio data to the audio decoder 33, and outputs the still image data to the still image decoder 34.

The moving image decoder 32 decodes the moving image data and outputs the data to the moving image analysis unit 35. The audio decoder 33 decodes the audio data and outputs the data to the audio analysis unit 36. The still image decoder 34 decodes the still image data and outputs the data to the still image analysis unit 37.

The moving image analysis unit 35 extracts objective feature information from the moving image data and extracts subordinate meta information (meaning information) on the basis of the feature information. In the same way, the audio analysis unit 36 and the still image analysis unit 37 extract objective feature information from the audio data and the still image data, respectively, and extracts subordinate meta information on the basis of the feature information. To extract the subordinate meta information, the technique is also used which is described in Understanding Video Events: A Survey of Methods for Automatic Interpretation of Semantic Occurrences in Video, Gal Lavee, Ehud Rivlin, and Michael Rudzsky, IEEE TRANSACTIONS ON SYSTEMS, MAN, AND CYBERNETICS-PART C: APPLICATIONS AND REVIEWS, VOL. 39, NO. 5, September 2009.

In the extraction of the feature information, the moving image analysis unit 35 performs pixel-based processes such as a color and texture feature extraction, a gradient calculation, and an edge extraction or object-based processes such as detection and recognition of a person or face, recognition of an object, movement detection and speed detection of a person, face, or object. In the person detection, the moving image analysis unit 35 uses a feature filter indicating a human shape or the like, thereby detecting an area which indicates a person from the moving image. In the face detection, the moving image analysis unit 35 uses, for example, a feature filter that indicates a feature of positional relations of eyes, a nose, eyebrows, hair, cheeks, and the like or skin color information, thereby detecting an area which indicates a face from the moving image.

In addition, the moving image analysis unit 35 is capable of not only recognizing existence or nonexistence of a person or face but also recognizing a specific person. For the recognition, for example, an edge strength image feature, a frequency strength image feature, a higher order autocorrelation feature, a color conversion image feature, or the like is used. For example, in the case where the edge strength image is used, the moving image analysis unit 35 stores, as feature data of a person (a person concerned such as a parent, a child, a spouse, and a friend) to be recognized, a grayscale image and the edge strength image, extracts, from an face image of a person whose face is detected, the grayscale image and the edge strength image in the same way, and performs pattern matching of both the grayscale images and both the edge strength images, thereby recognizing the face of a specific person.

In the object recognition, the moving image analysis unit 35 uses, for example, a stored recognition model to recognize an object unique to each event, thereby judging whether an object to be identified is included or not. The recognition model is constructed from an image for learning in advance by machine learning such as SVM (support vector machines).

Further, the moving image analysis unit 35 is also capable of recognizing the background except the person and object in the moving image. For example, the moving image analysis unit 35 uses the model constructed in advance by the machine learning such as the SVM from the image for the learning, thereby classifying the background of the moving image into, for example, a town, an interior, an exterior, a seashore, a scene in water, a night scene, a sunset, a snow scene, or congestion.

Here, in the case where the moving image content is constituted of a plurality of scenes, before the extraction of the subordinate meta information, the moving image analysis unit 35 detects a video feature such as a cut and a fade from the moving image content and classifies the moving image content into the plurality of scenes.

The audio analysis unit 36 detects, from the audio data, the voice of a person, the sound in an environment except the person, and a feature such as power and pitch thereof in the extraction of the feature information. To distinguish between the voice of a person and the sound in the environment, the duration of audio of predetermined power or more is used, for example.

In the extraction of the feature information, the still image analysis unit 37 performs static processes of the analysis processes which can be performed by the moving image analysis unit 35, such as the color and texture feature extraction, the gradient calculation, the edge extraction, the detection of a person, a face, or an object, and the recognition of a background.

Further, in the case where tag (label) information is contained in each piece of data, the analysis units 35 to 37 extract the tag information as the feature information. As the tag information, for example, information which indicates the details of an event or information of a date of image taking and a location of image taking is used.

On the basis of the feature information extracted by each of the analysis units 35 to 37, the analysis units 35 to 37 extract subordinate meta information (meaning information) to which more specific meaning is added.

For example, on the basis of the person feature or face feature extracted, the moving image analysis unit 35 recognizes, as the subordinate meta information, the individual, sex, age, facial expression, posture, clothes, number of persons, lineup, or the like. In addition, on the basis of the movement feature, the moving image analysis unit 35 recognizes an active or inactive movement, a rapid or slow movement, or an activity of a person such as standing, sitting, walking, and running or recognizes a gesture or the like expressed with the hand of the person.

The audio analysis unit 36 extracts, as the subordinate meta information, applause, a cheer, a sound from a speaker, a feeling corresponding to voice, a laugh, a cry, the details of a talk, a special extent obtained based on an echo, or the like from the audio feature extracted, for example.

The still image analysis unit 37 recognizes meta information that does not relate to the movement feature, out of the meta information that can be recognized by the moving image analysis unit 35.

For the extraction of the subordinate meta information as described above, for example, a method based on a state space representation such as a Bayesian network, a finite state machine, a conditional random field (CRF), and a hidden Markov model (HMM), a method based on a meaning model such as a logical approach, a discrete event system such as a Petri net, and a constraint satisfaction model, a traditional pattern recognition/classification method such as an SVM, a nearest neighbor method, and a neutral net, or various other methods are used.

The superordinate meaning information analysis unit 38 analyzes the superordinate meta information on the basis of the subordinate meta information extracted by each of the analysis units 35 to 37 and derives top meta information, which can explain the whole of one scene of the moving image and one group of the still image (those will be collectively referred to as "scene"), that is, an event. To derive the event, the technique is also used which is disclosed in Event Mining in Multimedia Streams: Research on identifying and analyzing events and activities in media collections had led to new technologies and systems, Lexing Xie, Hari Sundaram, and Murray Campbell, Proceedings of the IEEE Vol. 96, No. 4, April 2008.

Specifically, on the basis of the pieces of the subordinate meta information, the superordinate meaning information analysis unit 38 analyzes a plurality of pieces of meta information corresponding to Who, What, When, Where, Why, and How (hereinafter, referred to as 5W1H), gradually increases the level of abstraction, and eventually categorizes scenes as one event.

For example, from the moving image or the still image, meta information relating to a person such as "a large number of children", "a large number of parents and children", and "gym clothes", meta information relating to the movement of a person such as an "active movement" and "running form", and meta information relating to a general object such as a "school building" are extracted. From the sound, meta information such as "voice of a person through a speaker", "applause", and a "cheer" is extracted. Further, in the case where positional information such as an "elementary school", information of the season (date) of "autumn", and the like are obtained as other meta information, the superordinate meaning information analysis unit 38 derives an event conceivable by integrating those pieces of information, an "athletic meet in an elementary school". Further, in the case where meta information relating to a person who takes images or the family is extracted, the superordinate meaning information analysis unit 38 can even derive the event, the "athletic meet in the elementary school of XX".

The subordinate meaning information analysis unit 39 generates action history information of a user of the PC 100 on the basis of the subordinate meta information extracted of each of the analysis units 35 to 37. Specifically, for example, on the basis of the meta information such as positional information (GPS information) added at a time when the still image or moving image is taken, date information, an object, and a background, the subordinate meaning information analysis unit 39 generates, as the action history information, a location where the user of the PC 100 has visited and a date when the user has visited.

The individual feature extraction unit 40 generates information that features the user of the PC 100 (hereinafter, referred to as individual feature information) on the basis of the event (superordinate meta information) derived by the superordinate meaning information analysis unit 38.

The individual meta DB 41 associates the action history information generated by the subordinate meaning information analysis unit 39 with the information for featuring the individual, which has been generated by the individual feature extraction unit 40, and stores the information associated. The individual meta DB 41 and the superordinate meta information and the subordinate meta information used for the generation are periodically transmitted to the server 200, for example.

Figure 5:
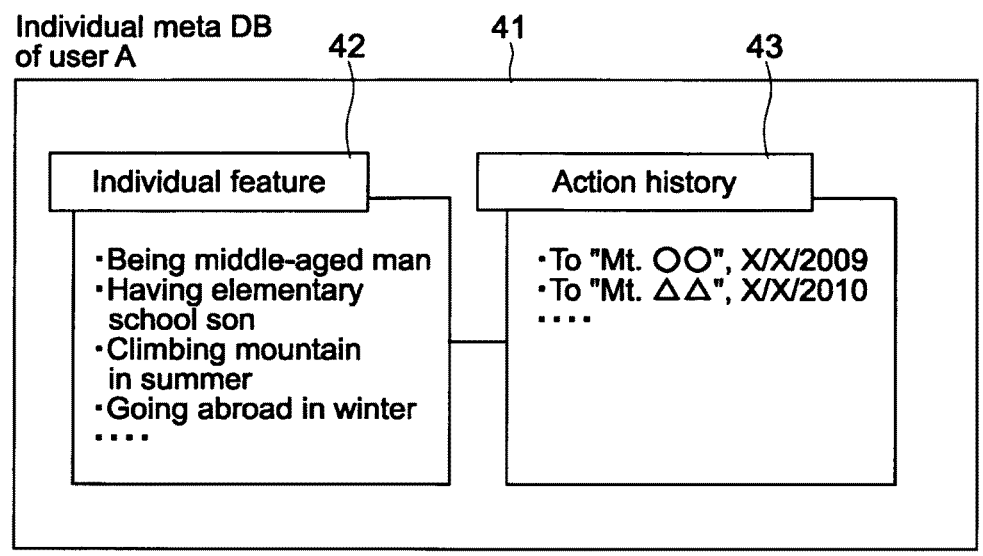
FIG. 5 is a diagram showing an example of an individual meta DB in the embodiment of the present invention.

FIG. 5 is a diagram showing an example of the individual meta DB 41. As shown in FIG. 5, the individual meta DB 41 includes an individual feature information 42 and an action history information 43.

The individual feature information 42 is information for featuring the individual of a user A of the PC 100, which is derived from the superordinate meta information such as "being a middle-aged man", "having an elementary school son", "climbing a mountain in summer", and "going abroad in winter". The individual feature information 42 includes any of the pieces of information corresponding to 5W1H.

The action history information 43 is information for indicating the "place" that has visited by the user of the PC 100 and the "date" for each visit. The information is derived from the subordinate meta information such as "To 'Mt. OO', x/x/2009" and "To 'Mt. ΔΔ', x/x/2010".

Returning to FIG. 4, the server 200 has a content DB 51, a multiuser statistics meta DB 52, and a related content selection unit 53.

The content DB 51 associates content information that indicates a commodity or a service as candidates to be recommended to the user of the PC 100 or the users of the other PCs 150 with information that is useful for the recommendation and stores the associated information. The information that is useful for the recommendation refers to a place (destination) in the case where travel goods are recommended, for example.

The multiuser statistics meta DB 52 stores a result obtained by performing a statistical process of the individual meta DBs 41 periodically received from the PC 100 and the other PCs 150 and the pieces of superordinate meta information and the pieces of subordinate meta information included therein. For the statistical process, an algorism such as collaborative filtering is used.

The related content selection unit 53 checks the multiuser statistics meta DB 52 against the superordinate meta information received from the PC 100 or the other PCs 150, thereby selecting content information that is judged to be related to the action of the user of the PC 100 or of the other PCs 150, to transmit the content information to the PC 100 or the other PCs 150.

Figure 6:
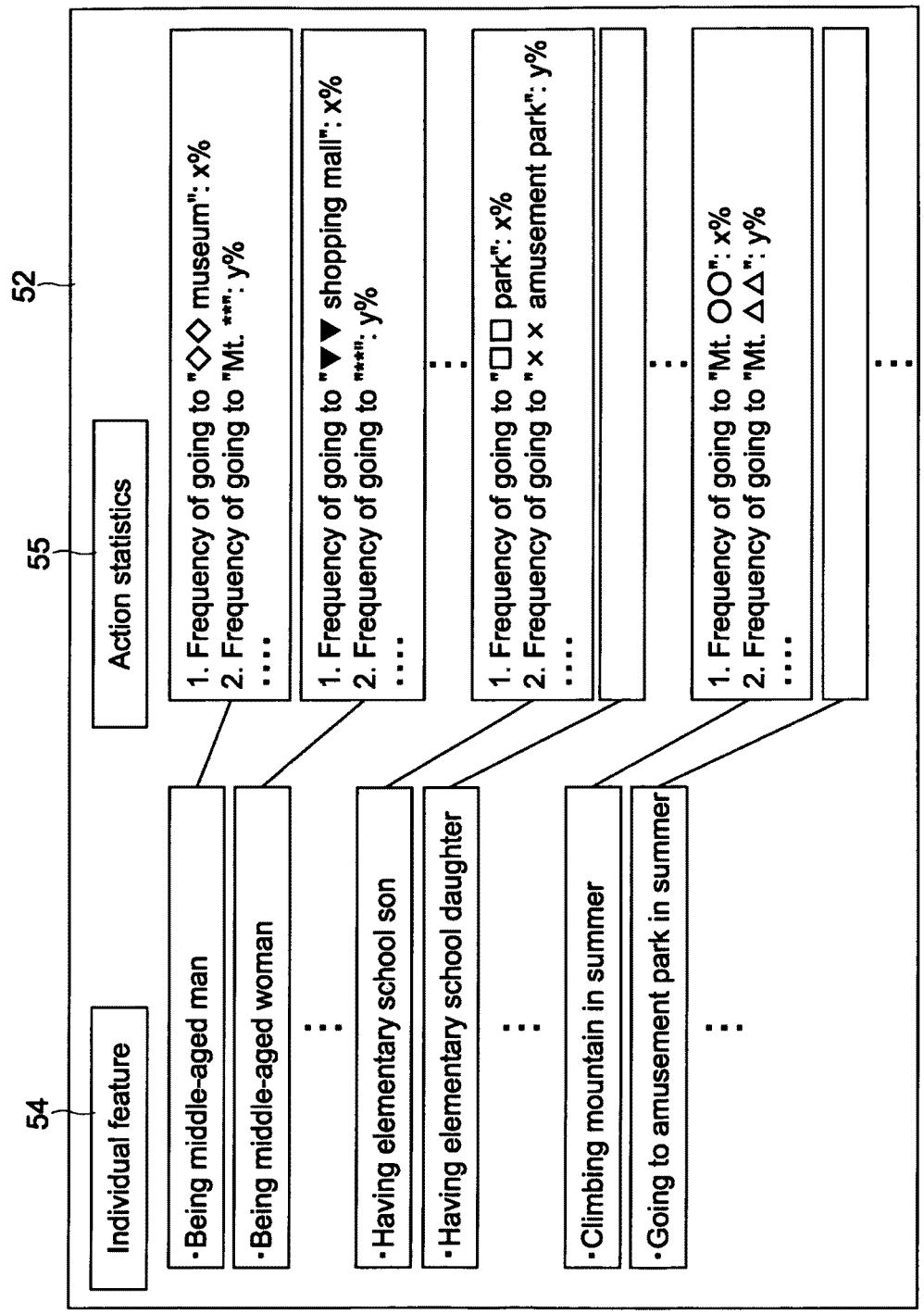
FIG. 6 is a diagram showing an example of a multiuser statistics meta DB in the embodiment of the present invention.

FIG. 6 is a diagram showing an example of the multiuser statistics meta DB 52. As shown in FIG. 6, the multiuser statistics meta DB 52 has an individual feature information 54 and an action statistical information 55.

The individual feature information 54 classifies the pieces of superordinate meta information collected from the PC 100 and the other PCs 150 in accordance with attributes thereof and stores the information classified. For example, the information indicating the age and sex, such as "being a middle-aged man" and "being a middle-aged woman", the information indicating the family, such as "having an elementary school son" and "having an elementary school daughter", and the information indicating the action pattern for each season, such as "climbing a mountain in summer" and "going to an amusement park in summer" are stored as classified pieces of information different from each other.

The action statistical information 55 is information that indicates frequencies of the action patterns derived from the pieces of subordinate meta information as derive sources thereof through association with the classified information of the individual feature information 54. For example, in the individual feature information 54 as "being a middle-aged man", as the action pattern of the middle-aged man, "frequency of going to ◇◇ museum (x %)", "frequency of going to 'Mt. **' (y %)", and the like are stored in descending order of frequency.

That is, from the multiuser statistics meta DB 52, a person and the action pattern the frequency of which is highest are grasped. For example, it is grasped that the middle-aged man most frequently goes to ◇◇ museum, and the person who has an elementary school son most frequently goes to □□ park.

(Operations of PC and Server)

Figure 7:
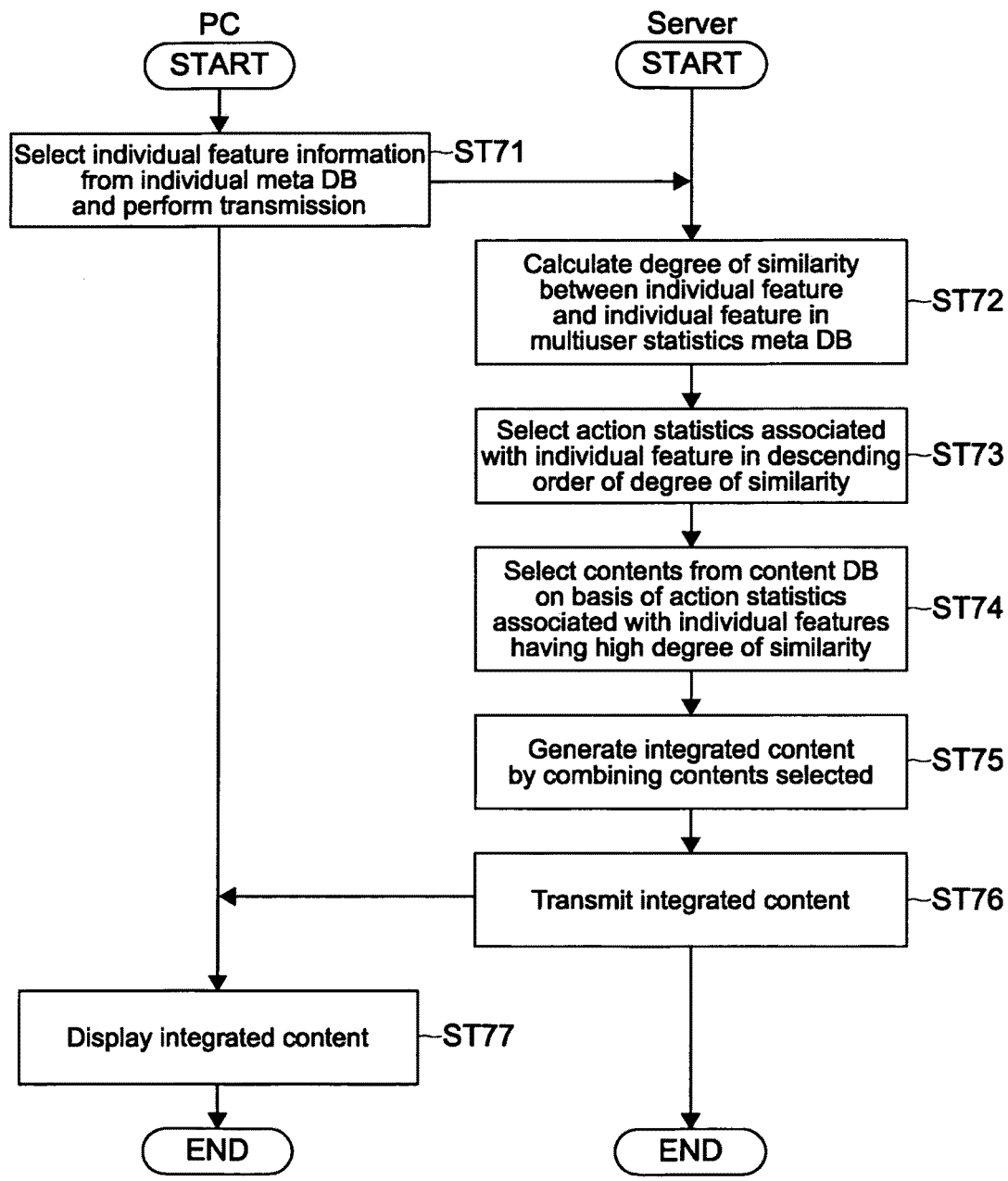
FIG. 7 is a sequence diagram showing the flow of a reproduction control process performed by the PC and the server according to the embodiment of the present invention.

Next, a description will be given on content recommendation operations performed by the PC 100 and the server 200 configured as described above. In the following description, the CPU 11 of the PC 100 and the CPU 21 of the server 200 are the mains of the operations. However, the following operations are also performed in cooperation with another hardware or software such as the content recommendation application of the PC 100 and the recommendation content selection application of the server 200. FIG. 7 is a sequence diagram showing the flow of a reproduction control process performed by the PC 100 and the server 200.

As shown in FIG. 7, first, the CPU 11 of the PC 100 selects and transmits any individual feature information 42 to the server 200 at a timing when the user inputs a request for a content recommendation, for example (Step 71). Alternatively, the server 200 selects any individual feature information 42 from the individual meta DB 41 that has already received at a timing when the request is transmitted to the server 200.

Subsequently, the CPU 21 of the server 200 calculates the degree of similarity between the individual feature information 42 selected and each of the pieces of individual feature information 54 in the multiuser statistics meta DB 52 (Step 72). Here, the details of a degree-of-similarity calculation process of the individual feature information will be described.

Figure 8:
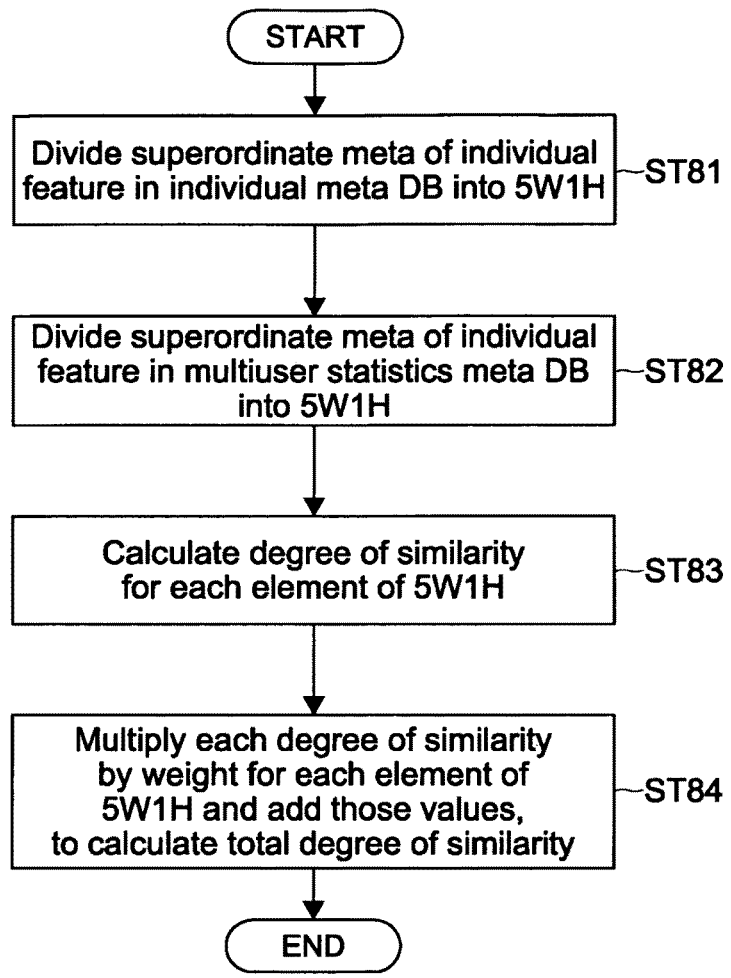
FIG. 8 is a flowchart showing the flow of a degree-of-similarity calculation process of individual features in the embodiment of the present invention.

FIG. 8 is a flowchart showing the flow of the degree-of-similarity calculation process of the individual feature information. FIG. 9 are diagrams showing an example of the degree-of-similarity calculation process.

As shown in FIG. 8, first, the CPU 21 divides the superordinate meta information included in the individual feature information 42 in the individual meta DB 41 into elements of 5W1H (Step 81). For example, as shown in FIG. 9A, the superordinate meta information of "Being a middle-aged man. Having an elementary school son. Climbing a mountain in summer" is divided into a piece of information of "a middle-aged man" corresponding to "Who", a piece of information of "summer" corresponding to "When", and a piece of information of "climbing a mountain" corresponding to "What".

Then, in the same way, the CPU 21 divides the superordinate meta information included in the individual feature information 54 in the multiuser statistics meta DB into the elements of 5W1H (Step 82).

Subsequently, the CPU 21 calculates the degree of similarity between the individual feature information 42 and the individual feature information 54 for each element of 5W1H divided (Step 83). As shown in FIG. 9B, as an example, given is the case where the individual feature information 42 is information of "A boy goes camping by a lake in summer", and the individual feature information 54 is information of "A middle-aged man goes camping in a mountain in summer". In this case, the degree of similarity between the information of "boy" corresponding to "Who" in the individual feature information 42 and the information of "middle-aged man" corresponding to "Who" in the individual feature information is calculated to be "−0.5". Similarly, the degrees of similarity between the individual feature information 42 and the individual feature information 54 are calculated in terms of the information of "summer" and "summer" corresponding to "When", the information of "lake" and "mountain" corresponding to "Where", and the information of "go camping" and "go camping" corresponding to "What", respectively. As a result, the degrees of similarity of "1.0", "0.0", and "1.0" are obtained, respectively. For the calculation of the degrees of similarity, a dictionary such as a thesaurus is used, for example.

Then, as shown in FIG. 9B, the CPU 21 multiplies each of the degrees of similarity calculated by a predetermined weight for each element of 5W1H and adds those values, thereby determining the entire degree of similarity (Step 84). For example, the weights of the elements of "Who" and "What" are set to be larger, and the weight of the element of "Why" is set to be smaller. However, the setting is not limited to this.

As described above, the degrees of similarity are calculated for each element of 5W1H obtained from the superordinate meta information, with the result that the degrees of similarity of the pieces of individual feature information are obtained more accurately.

Returning to FIG. 7, in descending order of the degrees of similarity obtained by the assignment of the weights and addition with respect to the individual feature information 42 in the individual meta DB 41, the CPU 21 selects a predetermined number of pieces of action statistical information 55 equal to or more than two, which has been associated with the pieces of individual feature information in the multiuser statistics meta DB 52 (Step 73). Alternatively, the CPU 21 may select all the pieces of action statistical information 55 having a degree of similarity which is equal to or higher than a predetermined degree of similarity.

Subsequently, on the basis of the plurality of pieces of action statistical information 55 selected, the CPU selects a plurality of pieces of content information (Step 74).

Then, the CPU 21 combines the plurality of pieces of content information selected, thereby generating integrated content information (Step 75).

Here, a detailed description will be given on a method for creating the integrated content information from the plurality of pieces of content information by giving as an example the case where travel goods are recommended.

For the travel goods as the integrated content information, in addition to the recommendation of a certain destination, courses (accommodations, stopovers, tourist spots, shops, and the like) of the travel are also arranged with the use of the superordinate meta information.

First, the CPU 21 determines a destination of a travel. Specifically, the CPU 21 extracts the individual feature information 54 including a location name or a nature spot name (mountain, liver, sea, or the like) and determines, as the destination, a location or a nature spot included therein. This is based on the assumption that a place which another user has visited who has the individual feature information 54 which has high degree of similarity to the individual feature information 42 of the user of the PC 100 is also interesting for the user of the PC 100.

At this time, as described above, by using the superordinate meta information for the calculation of the degree of similarity, the CPU 21 can determine a destination which is fitter for the taste of the user of the PC 100 as compared to the case where the degree of similarity is calculated from the subordinate meta information.

For example, with regard to the still image or moving image obtained by shooting a situation in which the user of the PC 100 is climbing a mountain, there is a difference in whether climbing a mountain is to be recommended or not in a recommendation content later between the case where the subordinate meta information of "mountain" is just obtained and the case where the superordinate meta information of "climbing a mountain" is obtained.

Further, even if the subordinate meta information of a "building of a department store" is extracted from a moving image or a still image, it may be impossible to judge whether the user has just gone downtown where the department store is located or has actually gone shopping to the department store. This can be judged only by deriving the superordinate meta information of "having gone shopping to a department store". By using the superordinate meta information, the CPU 21 can classify whether the user "goes to shopping" or "goes downtown" as the individual feature information 42. Further, the CPU 21 can judge whether a shopping spot is incorporated in the travel courses.

In addition to the aforementioned method, with regard to only the destination, an option for manual determination by the user may be provided.

Next, the CPU 21 makes arrangement of the travel courses at the destination determined. The arrangement herein refers to determining specific courses of the travel which includes specific places to be actually visited by the user in the destination and the vicinity thereof, the visiting order, a place to sleep, transportation, and the like.

At this time, the CPU 21 can use action correlation information that is obtained from the superordinate and subordinate meta information of the PC 100.

For example, from the superordinate and subordinate meta information of the PC 100, the CPU 21 can recognize the correlation information of a plurality of actions such as "After going skiing, go to a hot spring with high frequency" and "When driving, go shopping at a shopping mall with high frequency". With the use of the superordinate and subordinate meta information that has received from the PC 100, the CPU 21 generates the correlation information, and can use the correlation information when selecting the plurality of pieces of content information or making a choice for generating the integrated content from the plurality of pieces of content information. In addition, the action correlation information of the user which includes the individual feature information having high degree of similarity may be used.

Of course, the correlation information may be generated at the same time when the individual meta DB 41 is generated in the PC 100, and be transmitted to the server 200.

Returning to FIG. 7, the CPU 21 transmits the integrated content information to the PC 100 (Step 76).

The CPU 11 of the PC 100 receives the integrated content information and displays the information on the display 16 as the recommendation content information.

FIG. 10 are diagrams showing a display example of the recommendation content information.

Figure 10B:
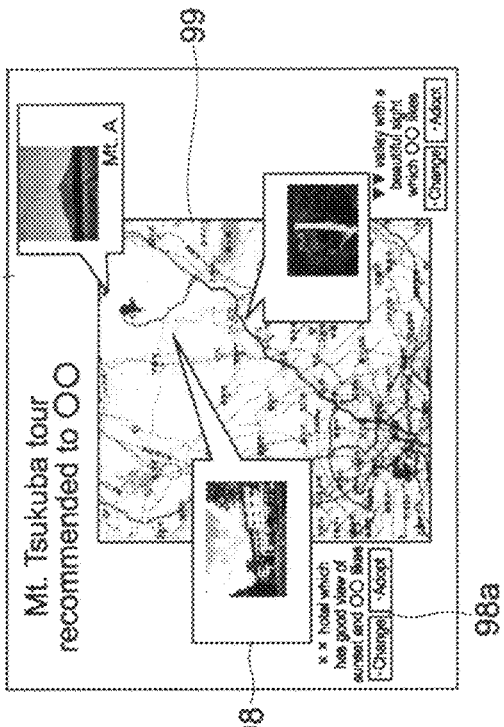
FIG. 10 are diagrams showing a display example of recommendation content information in the embodiment of the present invention.
Figure 10A:
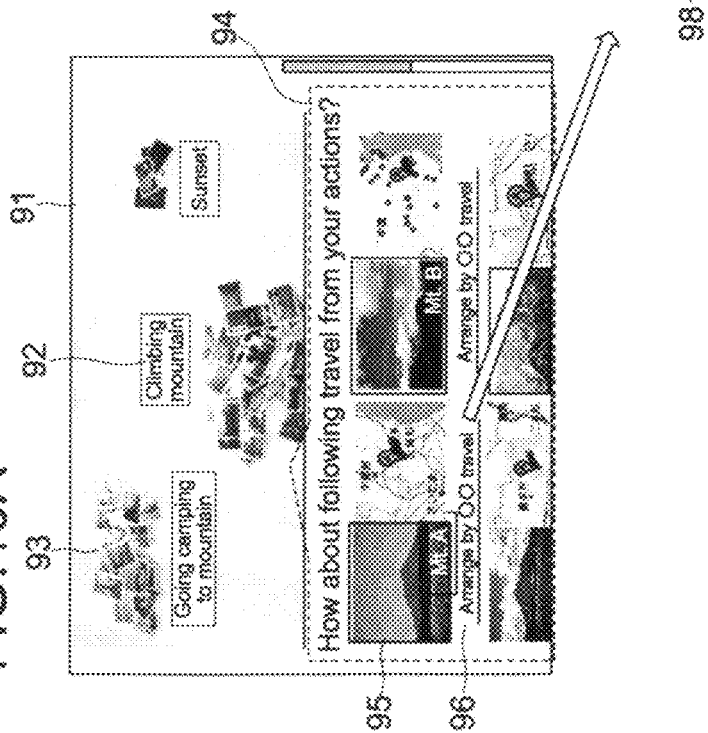

As shown in FIG. 10A, the CPU 11 can display a thumbnail viewer 91 of a moving image or a still image taken by the user, for example. On the thumbnail viewer 91, a thumbnail 93 of a moving image or a still image classified according to dates or positions is displayed as a plurality of clusters with an event name 92 obtained from the superordinate meta information, for example. On the viewer 91, in the case where, for example, the user places a pointer on a certain event name 92 or clicks the certain event name 92, the CPU 21 transmits to the server 200 the individual feature information 42 associated with the event name 92 as request information of the recommendation content information.

Further, the CPU 21 displays the list 94 of the content information obtained from the server 200 through the processes described above with the list being overlapped with the viewer 91, for example. In the list 94 of the content information, an outline information 95 of the pieces of content information and a link information 96 to the detailed information are displayed.

In the example of the travel goods described above, as the outline information 95, pictures and maps of the destination are displayed, and the link information 96 is clicked, thereby linking to a course detailed information 97, as the integrated content information, which is provided by a predetermined travel agency.

As shown in FIG. 10B, the course detailed information 97 includes a map 99 of the destination and pieces of course information 98 as the content information, which include pictures of spots in the courses and explanation information thereof. The course information 98 is displayed on the map 99.

In the example of FIG. 10B, as the pieces of course information 98, a destination of "Mt. Tsukuba" which is determined on the basis of the individual feature information 42 of "climbing a mountain", an accommodation facility of "xx hotel which has a good view of the sunset" which is selected from the individual feature information 42 of "watching the sunset", and a tourist spot of "▼▼ valley with a beautiful sight" which is selected from the individual feature information 42 of "visiting a valley with a beautiful sight" are indicated.

In the pieces of course information 98, buttons 98a of "change" and "adopt" for making a choice between changing the course information 98 and adopting the course information 98 as it is are also displayed. In the case where the button 98a of "change" is pressed, the CPU 11 requests an alternative course information 98 of the server 200. The server 200 selects new content information in response to the request and transmits to the PC 100 integrated content information updated in accordance therewith.

(Modified Example)

The present invention is not limited to the above embodiment and can be variously changed without departing from the gist of the present invention.

In the above embodiment, the related content selection unit 53 is provided to the server 200, but may be provided to the PC 100. That is, the PC 100 may download, for example, the multiuser statistics meta DB 52 from the server 200 and, on the basis of the DB, perform the calculation process of the degree of similarity and the generation process of the content information and the integrated content information. Further, the PC 100 may collects the individual meta DBs from the other PCs 150 or the like and construct the multiuser statistics meta DB 52. Furthermore, even if the multiuser statistics meta DB 52 is not constructed by the PC 100, only the individual meta DB 41 may be used, and the content information may be recommended on the basis of the action history of the user of the PC 100. For example, in the case where the action patterns of the user for each season are grasped from the individual feature information 42, the PC 100 may retrieve the content information of a commodity or a service which coincides with the action patterns for each season from the content DB 51 of the server 200 and display the content information.

In the above embodiment, the example is given in which the travel plan is recommended as the content information on the basis of the superordinate and subordinate meta information. However, content to be recommended is not limited thereto. For example, on the basis of the individual feature information 42 extracted from the still image or the moving image taken by the user, the PC 100 or the server 200 may predict an action that is taken or may be taken by the user in the near future (in several months) and recommend content information as a necessary commodity or service. FIG. 11 are diagrams showing an action prediction process in the case where the content information is recommended on the basis of the action prediction.

As shown in FIG. 11A, the PC 100 or the server 200 performs the statistical process of the individual feature information and the action history information (location information and date information) of the users of the PC 100 and the other PCs 150, which are obtained from the superordinate meta information, and generates an action prediction model of a plurality of users (hereinafter, referred to as multiuser action statistics model). As an example, used is a multiuser action statistics model obtained by setting, as action nodes, actions obtained from the superordinate meta information (for example, "traveling to ▼▼ with one of female friends" and "going to an amusement park with my child"), connecting the action nodes with a line which holds information (coefficient or the like) for calculating a probability of transition from an action node to another action node, and more suitably determining the information for the calculation by machine learning. In the example of FIG. 11A, an action A is highly probably transited to an action B and an action C, the action B is highly probably transited to an action E, and the action C is highly probably transited to an action F.

Next, the PC 100 or the server 200 selects an action node of the latest action from the individual feature information and the action history information of the user as a recommendation target. Then, the PC 100 or the server 200 calculates, from the multiuser action statistics model, probabilities of transition from the action node to subsequent nodes, and selects some action nodes in descending order of the probability of transition or some action nodes having a predetermined probability or more as an action prediction result. Then, the PC 100 or the server 200 recommends, to the user, a commodity or a service relating to the selected action nodes as the content information.

In the multiuser action statistics model, infinite kinds of action nodes are conceivable, so an action node which is the same as a latest action node of the user as the recommendation target is not necessarily included in the multiuser action statistics model. However, as in the case of the degree-of-similarity calculation process between the pieces of individual feature information in the above embodiment, the PC 100 or the server 200 can calculate the degree of similarity between the action nodes on the basis of the degree of similarity for each element of 5W1H, for example. the PC 100 or the server 200 uses the degree of similarity, thereby approximating the latest action node of the user and an action node having a high degree of similarity in the multiuser action statistics model, with the result that the action prediction can be performed even in the case where the same action node is not included.

For example, as shown in FIG. 11B, in the case where the latest action node of the user is the action C, and the action node is included in the multiuser action statistics model, it is predicted that the next action node is the action F. On the other hand, in the case where the latest action node of the user is an action G, which is not included in the multiuser action statistics model, the degrees of similarity between the action G and the other action nodes (actions B, C, and the like) are calculated. Out of the actions, the action C having a higher degree of similarity with the action G is led to prediction of the action F.

As described above, by constructing the multiuser action statistics model from the superordinate meta information, it becomes possible to perform more detailed action prediction as compared to the case where the multiuser action statistics model is constructed only by the subordinate meta information. For example, in addition to the subordinate meta information of "lots of students", "high school student", "school", and "spring", the superordinate meta information of "graduation ceremony" is derived from those pieces of subordinate meta information, and thus it is possible to predict the action of "being a university student and living on his/her own". On the basis of the action prediction, the PC 100 or the server 200 can recommend, as the content information, pieces of furniture, home appliance products, and the like necessary for a new life.

In addition, by using the superordinate meta information, a time series variation (tendency) of events in a slightly longer period is also grasped. As a result, the PC 100 or the server 200 can recommend a commodity or a service in accordance with a current tendency of the user. Alternatively, the PC 100 or the server 200 can recommend a commodity or a service in accordance with past likes and tastes of the user. For example, as the tendency of the action of the user, in the case where such a tendency is found that the frequency of sports events such as skiing and soccer is gradually reduced, the frequency of travel events is increased, then the frequency of travel events is reduced, and pictures relating to hobbies, such as flowers and cars, are increased, the PC 100 or the server 200 can recommend a commodity or a service which is useful for the hobbies in accordance with the current tendency (gardening goods in the case of flowers, auto shows in the case of cars), or can motivate the user to act by recommending commodities relating to skiing that is one of the past likes and tastes.

For the aforementioned action prediction process, the multiuser action statistics model is used, but is not essential. For example, the PC 100 may learn the individual feature information 42 and the action history information 43 in the individual meta DB 41 of the user, construct the individual action statistics model of the user, perform the action prediction on the basis of the individual action statistics model, retrieve the content information relating to the action predicted from the content DB 51 of the server 200, and display the content information.

In the above embodiment, the subordinate meta information and the superordinate meta information are extracted by the PC 100, but at least a part thereof may be extracted by another apparatus and be input along with an image when the image is input to the PC 100. For example, the subordinate meta information of a picture may be extracted by an image-taking apparatus such as a digital still camera and a digital video camera when a picture is taken, and input to the PC 100 along with the picture, and the PC 100 may extract the superordinate meta information from the subordinate information thereof. Further, the subordinate meta information which can be extracted by the image-taking apparatus with a relatively small calculation amount, such as face detection and night scene detection, may be extracted by the image-taking apparatus, and meta information which is extracted with a relatively large calculation amount, such as movement detection and general object recognition, may be extracted by the PC 100. Instead of the PC 100, a server on the network may extract the meta information, and the meta information may be input to the PC 100 through the communication unit 19.

The processes performed by the PC 100 in the above embodiment can also be performed by a PC (personal computer), a digital still camera, a digital video camera, a mobile phone, a smart phone, a recording and reproduction apparatus, a game machine, a PDA (personal digital assistant), an electronic book terminal, an electronic dictionary, portable AV equipment, and any other electronic apparatuses. A digital still camera or a digital video camera may be capable of extracting the subordinate or superordinate meta information from a moving image or still image taken. Alternatively, apparatuses other than the digital still camera or the digital video camera are provided with a camera for taking the moving image content or still image content and may be capable of extracting the superordinate and subordinate meta information in the same way as above.

It should be understood by those skilled in the art that various modifications, combinations, sub-combinations and alterations may occur depending on design requirements and other factors insofar as they are within the scope of the appended claims or the equivalents thereof.

What is claimed is:

1. A server apparatus, comprising:
    a first memory which stores statistical information that is generated by performing a statistical process of a plurality of pieces of first meta information and a plurality of pieces of second meta information and that indicates a frequency of the plurality of pieces of first meta information as a derivation source of the plurality of pieces of second meta information for each piece of second meta information, the plurality of pieces of first meta information being extracted from image data taken by a plurality of users, the plurality of pieces of second meta information being derived from the plurality of pieces of first meta information through an analysis;
    a second memory which stores a plurality of different pieces of content information that indicates one of a commodity content and a service content to be recommended;
    a network interface card to receive, from a client apparatus of one of the plurality of users, the second meta information derived from the plurality of pieces of first meta information in the client apparatus; and
    a central processing unit to control selecting, on the basis of the second meta information received and the statistical information stored, content information relating to the first meta information having predetermined frequencies or more with respect to the received second meta information from the plurality of pieces of content information stored, and to control the network interface card to transmit the content information selected to the client apparatus,
    in which the first meta information represents an event corresponding to a number of scenes,
    in which the second meta information is obtained from feature or tag information representative of a detail or details pertaining to the event such that the obtained second meta information is more specific than the respective feature or tag information,
    the central processing unit is configured to (i) divide the first meta information of the first memory into pieces pertaining to "who", "what", "when", "where", "why" and "how", wherein the "who" element is not a personal identity (ii) calculate a degree of similarity for each obtained divided element as compared to that similarly obtained from the client apparatus, (iii) multiply each calculated degree of similarity by a respective predetermined weight value to obtain a number of multiplied weighted values, wherein the predetermined weight value for each element is non-zero and (iv) utilize the multiplied weighted values to select the content information.

2. The server apparatus according to claim 1, wherein
the second meta information includes person information that indicates a person in the image and action information that indicates action details of the person,
and the central processing unit is configured
to compare first person information and first action information that are included in the second meta information included in the statistical information with second person information and second action information that are included in the second meta information transmitted from the client apparatus, respectively, to calculate a first degree of similarity that indicates a degree of similarity between the first person information and the second person information and a second degree of similarity that indicates a degree of similarity between the first action information and the second action information,
to calculate a third degree of similarity by adding the first degree of similarity and the second degree of similarity calculated, and
to select content information relating to the first meta information having the predetermined frequencies or more with respect to the second meta information having the third degree of similarity that is equal to or higher than a predetermined degree of similarity with the second meta information transmitted from the client apparatus.

3. The server apparatus according to claim 2, wherein
the content information is information that indicates a commodity for a travel, the network interface card is configured to receive the plurality of pieces of second meta information from the client apparatus, and the central processing unit is configured to select, for each piece of second meta information, pieces of content information that relate to the plurality of pieces of first meta information having the predetermined frequencies or more with respect to the plurality of pieces of second meta information received and that are capable of being set as courses in the travel, to generate integrated content information obtained by integrating the pieces of content information selected, and to control the network interface card to transmit the integrated content information generated to the client apparatus.

4. The server apparatus according to claim 3, wherein the plurality of pieces of second meta information received has correlation information that indicates a correlation of a plurality of pieces of action information, and the central processing unit is configured to determine the pieces of content information set as the courses and an order of setting thereof on the basis of the correlation information.

5. The server apparatus according to claim 2, wherein the second meta information has date information that indicates a date corresponding to the action information, and the central processing unit is configured to generate, on the basis of the action information and the date information that are included in the plurality of pieces of second meta information included in the statistical information, transition probability information that indicates a probability of transition from a first action detail to a second action detail out of the action details, and to select, on the basis of the transition probability information generated, content information relating to an action detail whose probability of transition from the action detail indicated by the action information included in the second meta information received is equal to or higher than a predetermined probability.

6. A content recommendation method, comprising:

storing statistical information that is generated by performing a statistical process of a plurality of pieces of first meta information and a plurality of pieces of second meta information and that indicates a frequency of the plurality of pieces of first meta information as a derivation source of the plurality of pieces of second meta information for each piece of second meta information, the plurality of pieces of first meta information being extracted from image data taken by a plurality of users, the plurality of pieces of second meta information being derived from the plurality of pieces of first meta information through an analysis;

storing a plurality of different pieces of content information that indicates one of a commodity content and a service content to be recommended;

receiving, from a client apparatus of one of the plurality of users, the second meta information derived from the plurality of pieces of first meta information in the client apparatus;

selecting, on the basis of the second meta information received and the statistical information stored, content information relating to the first meta information having predetermined frequencies or more with respect to the received second meta information from the plurality of pieces of content information stored; and transmitting the content information selected to the client apparatus, in which the first meta information represents an event corresponding to a number of scenes, and in which the second meta information is obtained from feature or tag information representative of a detail or details pertaining to the event such that the obtained second meta information is more specific than the respective feature or tag information, in which the selecting includes (i) dividing the first meta information associated with the stored statistical information into pieces pertaining to "who", "what", "when", "where", "why" and "how", wherein the "who" element is not a personal identity (ii) calculating a degree of similarity for each obtained divided element as compared to that similarly obtained from the client apparatus, (iii) multiplying each calculated degree of similarity by a respective predetermined weight value to obtain a number of multiplied weighted values, wherein the predetermined weight value for each element is non-zero and (iv) utilizing the multiplied weighted values to select the content information.

7. A non-transitory computer readable memory having stored thereon a program configured to cause a server apparatus to execute the steps of:

storing statistical information that is generated by performing a statistical process of a plurality of pieces of first meta information and a plurality of pieces of second meta information and that indicates a frequency of the plurality of pieces of first meta information as a derivation source of the plurality of pieces of second meta information for each piece of second meta information, the plurality of pieces of first meta information being extracted from image data taken by a plurality of users, the plurality of pieces of second meta information being derived from the plurality of pieces of first meta information through an analysis;

storing a plurality of different pieces of content information that indicates one of a commodity content and a service content to be recommended;

receiving, from a client apparatus of one of the plurality of users, the second meta information derived from the plurality of pieces of first meta information in the client apparatus;

selecting, on the basis of the second meta information received and the statistical information stored, content information relating to the first meta information having predetermined frequencies or more with respect to the received second meta information from the plurality of pieces of content information stored; and transmitting the content information selected to the client apparatus, in which the first meta information represents an event corresponding to a number of scenes, and in which the second meta information is obtained from feature or tag information representative of a detail or details pertaining to the event such that the obtained second meta information is more specific than the respective feature or tag information, in which the selecting step includes (i) dividing the first meta information associated with the stored statistical information into pieces pertaining to "who", "what", "when", "where", "why" and "how", wherein the "who" element is not a personal identity (ii) calculating a degree of similarity for each obtained divided element as compared to that similarly obtained from the client apparatus, (iii) multiplying each calculated degree of similarity by a respective predetermined weight value to obtain a number of multiplied weighted values, wherein the predetermined weight value for each element is non-zero and (iv) utilizing the multiplied weighted values to select the content information.

8. The server apparatus according to claim 1, in which the predetermined weight value of "who" is higher than that of "why", and the predetermined weight value of "what " is higher than that of "why".

9. The non-transitory computer readable memory according to claim 7, in which the predetermined weight value of "who" is higher than that of "why", and the predetermined weight value of "what" is higher than that of "why".

10. The content recommendation method according to claim 6, in which the predetermined weight value of "who" is higher than that of "why", and the predetermined weight value of "what" is higher than that of "why".

* * * * *